US008074292B2

(12) United States Patent
Bostel et al.

(10) Patent No.: US 8,074,292 B2
(45) Date of Patent: Dec. 6, 2011

(54) HIGH RESOLUTION WIDE ANGLE TOMOGRAPHIC PROBE

(75) Inventors: Alain Bostel, La Haye du Theil (FR); Mikhail Yavor, Saint-Petersbourg (RU); Ludovic Renaud, Paris (FR); Bernard Deconihout, Rouen (FR)

(73) Assignee: Cameca (FR)

( * ) Notice: Subject to any disclaimer, the term of this patent is extended or adjusted under 35 U.S.C. 154(b) by 64 days.

(21) Appl. No.: 12/682,700

(22) PCT Filed: Oct. 8, 2008

(86) PCT No.: PCT/EP2008/063462
§ 371 (c)(1),
(2), (4) Date: Apr. 19, 2010

(87) PCT Pub. No.: WO2009/047265
PCT Pub. Date: Apr. 16, 2009

(65) Prior Publication Data

US 2010/0223698 A1 Sep. 2, 2010

(30) Foreign Application Priority Data

Oct. 12, 2007 (FR) ..................................... 07 07178

(51) Int. Cl.
*G01Q 60/00* (2010.01)

(52) U.S. Cl. ................ 850/21; 850/5; 850/10; 250/306; 250/307; 250/308; 250/310; 250/311

(58) Field of Classification Search .......... 250/306–308, 250/310, 311; 850/5, 10, 21
See application file for complete search history.

(56) References Cited

U.S. PATENT DOCUMENTS

2006/0113470 A1* 6/2006 Gribb ............................ 250/310
2007/0073364 A1* 3/2007 Meissner et al. ................ 607/88

FOREIGN PATENT DOCUMENTS

JP 2007-40966 A 2/2007

OTHER PUBLICATIONS

A. Cerezo, et al., "Design of a Scanning Atom Probe with Improved Mass Resolution", Review of Scientific Instruments, Aug. 1, 2000, pp. 3016-3023, vol. 71,No. 8, American Institute of Physics, Melville, NY, USA. XP012038436.
A. Cerezo, et al., "Einzel Lenses in Atom Probe Designs", Surface Science Netherlands, Apr. 1991, pp. 460-466, vol. 246, No. 1-3. XP007904810.

* cited by examiner

*Primary Examiner* — Robert Kim
*Assistant Examiner* — Meenakshi Sahu
(74) *Attorney, Agent, or Firm* — Baker & Hostetler, LLP

(57) ABSTRACT

The present invention concerns the enhancing of the mass resolution of wide angle tomographic atom probes. The invention consists of an atom probe also comprising a sample-holding device and a detector which are separated from one another by a distance L and enclosed in a chamber, an "Einzel" type electrostatic lens consisting of three electrodes arranged inside the chamber between the sample and the detector, to which electrical potentials are applied so as to form an electrical field that strongly focuses the beam of ions emitted by the sample under test when the probe is operating. According to the invention, the geometry of the electrodes is defined precisely so as to greatly limit the effects of the spherical aberration that affects the "Einzel" lens on the beam of ions, said spherical aberration being clearly sensitive when the lens is greatly polarized. The invention applies more particularly to the atom probes known as 3D atom probes.

14 Claims, 6 Drawing Sheets

HIGH RESOLUTION WIDE ANGLE TOMOGRAPHIC PROBE

CROSS-REFERENCE TO RELATED APPLICATIONS

This application is a National Stage of International patent application PCT/EP2008/063462, filed on Oct. 8, 2008, which claims priority to foreign French patent application No. FR 07 07178, filed on Oct. 12, 2007, the disclosures of which are hereby incorporated by reference in their entirety.

FIELD OF THE INVENTION

The present invention concerns enhancing the mass resolution of wide angle laser tomographic probes. It relates more particularly to the atom probes known as 3D atom probes.

BACKGROUND OF THE INVENTION

The atom probe is an instrument that is well known to those skilled in the art which can be used to analyse samples on an atomic scale. Numerous instrument configurations based on this analysis technique are described in the work entitled "Atom probe field Ion microscopy", by Miller et al., published in 1996 by Clarendon Press/Oxford.

For such an analysis, it is conventional to use a pointed sample, that is: a sample with a pointed shape, raised to a given potential relative to the potential of the detector and to have, in the vicinity of this sample, an electrode raised to an intermediate potential between that of the sample and that of the detector.

It is also conventional to have, in addition to this electrode, another, grounded, electrode, or even a grating that is also grounded. Given that the detector is grounded, the ions separated from the sample follow a trajectory which projects them onto the detector without being influenced by any electrical field that might alter this trajectory. Almost all of the path of the ions is thus contained within a so-called "fieldless" space.

It is also known that an essential parameter for obtaining a fine and accurate measurement of the characteristics of the ions detected by an atom probe is the measurement of the flight time of the detected ions, that is to say the time taken by the ion concerned to travel through the space separating the sample from which they are separated from the detector. More specifically, the flight time is the time interval between an event triggering the separating of the ion and its impact on the detector. The triggering event can be an electrical pulse delivered to the electrode adjacent to the sample or a pulse of a laser beam directed to the sample. Inasmuch as the measurement of the flight time is essential in the instrument for identifying the m/q ratio of a detected ion, m being the mass of the ion and q its electrical charge, it is advantageous to increase the distance L between the sample and the detector in order to also increase the flight time. However, since the beam of emitted ions is naturally divergent, a counterpart to this increase in the distance L is that a large proportion of the emitted beam may then escape the detector, the detector having defined and necessarily limited dimensions. To overcome this drawback, it is known to interpose a convergent device such as an "Einzel" lens between the sample and the detector to focus the beam of ions on the detector. The "Einzel" lens is, moreover, a device that is well known in charged particle optics and its principle is not detailed here. For more information on "Einzel" lenses, reference can notably be made to volume 2 of the work entitled "Principles of electron optics", by P. W. Hawkes and E. Kasper, published in 1989 by Academic Press.

Among the tomographic atom probes, there are in particular atom probes known in the literature by the name "3DAP" or "TriDimensional Atom Probe", or even by the name "PoSAP" or "Position Sensitive Atom Probe". These probes are advantageously characterized by the fact that, with such a detector, not only is the moment of impact, which measures the flight time of an ion, measured, but also the position, in a plane, of this impact on the detector. However, such a measurement is truly possible only if the position of the point of impact of a given ion is linked unambiguously to its position in the sample being analysed. This condition is reflected in the fact that two distinct ion trajectories should not culminate at the same point of impact on the detector.

However, although it is easy to simply vary the emission angle picked up by the detector with an Einzel lens, a strong focussing of the beam of ions emitted using such a lens leads to the appearance of a spherical aberration on the lens, an aberration that produces, on the outer trajectories, parasitic effects that greatly interfere with the operation of the 3D probe. In practice, because of this aberration, distinct trajectories end at the same point of impact.

SUMMARY OF THE INVENTION

One aim of the invention is to propose a solution for obtaining a tomographic probe, a pulsed 3D probe, a pulsed laser probe in particular, that simultaneously has a wide analysis angle (a wide acceptance) and a wide mass resolution following a long flight.

To this end, the subject of the invention is a tomographic atom probe comprising:

- a sample-holding device for receiving a sample of material to be analysed having an extraction area of substantially pointed shape,
- a position- and time-sensitive detector, of useful diameter D, and spaced apart from the sample by a distance L;
- an electrostatic lens consisting of three electrodes, a first electrode or extractor, arranged in proximity to the sample, an intermediate second electrode, and a third electrode arranged between the intermediate electrode and the detector, the three electrodes having a symmetry of revolution about the axis Oz passing through the point of the sample and perpendicular to the plane P of the detector;

and characterized in that, since the distance L is greater than 2.75 D, the respective potentials of the sample, of the first electrode of the lens and of the detector are such that the ions deriving from the sample mounted on the sample-holder are attracted towards the first electrode and towards the detector; the cross-sectional profile of the intermediate electrode, in a cross-sectional plane rOz defining three points $M_1$, $M_2$ and $M_3$ of respective coordinates ($r_1$, ($r_2$, $z_2$) and ($r_3$, $z_3$) relative to an origin $z_0$ on the point of the sample, which satisfy the following conditions, it being understood that the positive direction along the axis Oz goes from the sample to the detector:

$$z_1 < z_2 < z_3,$$

$$|z_1 - z_0| < D/3,$$

$$|z_2 - z_1 < 0.65 \cdot D,$$

$$z_3 - z_1 > 1.4 \cdot D,$$

$r_2=r_1$, $0.1\cdot D<r_1<0.65\cdot D$, $D<r_3<1.6\cdot D$;

all the points of the cross-sectional profile of the electrode being situated outside the area of the cross-sectional plane delimited by the profile of a cone with cylindrical tip limited by the points $M_1$, $M_2$ and $M_3$.

According to a variant embodiment of the tomographic atom probe according to the invention, the detector or a grating arranged in proximity to the detector is at a potential equal to that of the extractor.

According to a variant embodiment of the tomographic atom probe according to the invention, the detector or a grating arranged in proximity to the detector is set to an intermediate potential between that of the sample and that of the extractor electrode.

According to another variant embodiment of the tomographic atom probe according to the invention, the diameter d of the aperture of the extractor is adapted so as to intercept the peripheral portion of the beam of emitted ions so as to block the ions that have the most peripheral trajectories.

According to this other variant embodiment, the extractor comprises a number of diaphragms of different aperture diameters, that can be alternately arranged at the level of the central aperture of the extractor.

According to this other variant embodiment, the different diaphragms are produced on a moving bar that can slide in front of the aperture of the extractor so as to place the desired diaphragm in front of the aperture; the sliding movement of the bar being automated.

According to a third variant embodiment of the tomographic atom probe according to the invention, the three electrodes are configured and arranged in such a way as to provide, inside the flight chamber, a free space that is sufficient to house a removable probe adjusting device.

According to a fourth variant embodiment of the tomographic atom probe according to the invention, a second electrostatic lens is placed between the first electrostatic lens and the detector.

According to this other variant embodiment, the first electrostatic lens is configured to focus the least open trajectories in proximity to the median plane of the second electrostatic lens.

Advantageously, the different variant embodiments can be combined or associated.

The invention offers the benefit of making it possible, for a given aperture angle of the beam of emitted ions and a given detector surface area, to produce a tomographic atom probe, in particular a "3D" probe, having an analysis length substantially greater than the existing probes.

BRIEF DESCRIPTION OF THE DRAWINGS

The features and benefits of the invention will be better appreciated from the following description, which explains the invention through a particular embodiment taken as a non-limiting example and which is based on the appended figures, the figures representing.

DETAILED DESCRIPTION OF PREFERRED EMBODIMENTS

Figure 1:
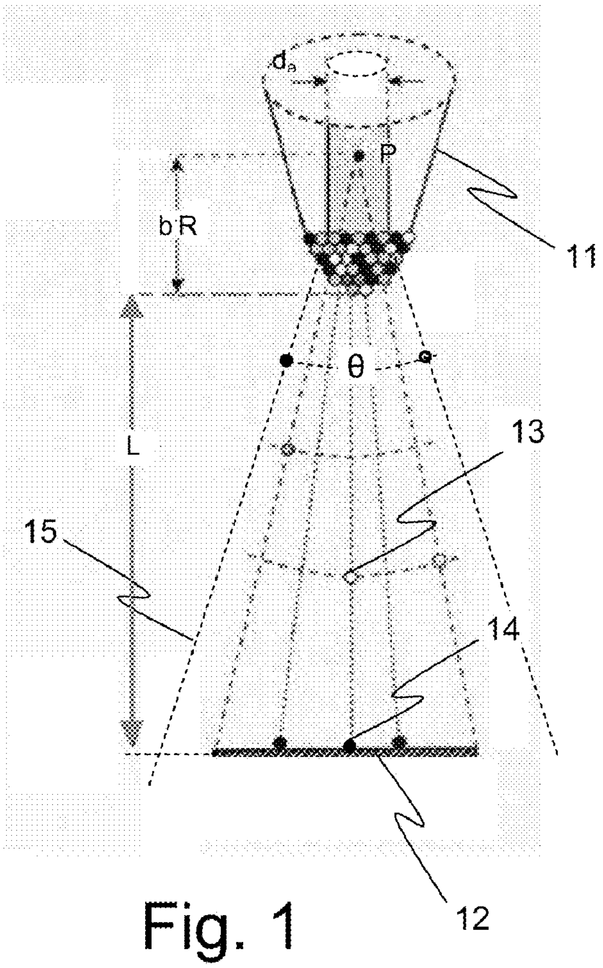
FIG. 1, an illustration of the general operating principle of a conventional tomographic probe.
Figure 2:
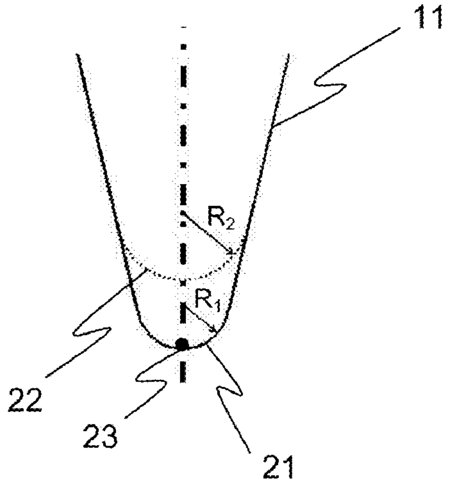
FIG. 2, a diagrammatic illustration of a sample being measured adapted to a tomographic probe.
Figure 3:
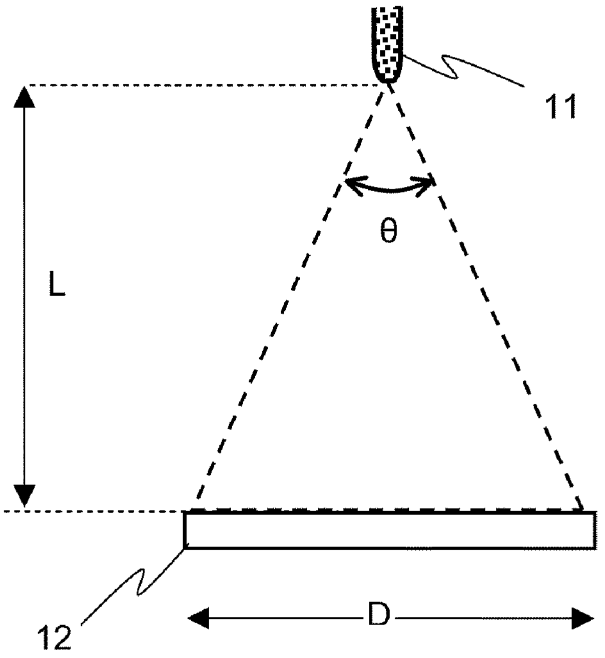
FIG. 3, an illustration of the physical principle of the measurement performed by means of a tomographic probe.

Interest is first focussed on FIGS. 1 to 3, which diagrammatically show the basic structure of a tomographic atom probe, notably of an atom probe known as a "3D" probe. This type of probe is well known to those skilled in the art, so this document does not describe such a device in detail. FIGS. 1 to 3 however provide a review of the following points.

A 3D tomographic atom probe is for analysing a sample of material 11, atom layer after atom layer. To this end, it basically comprises a sample-holding device on which the sample 11 of material to be analysed is mounted, and a detector 12 situated at a predetermined distance L from the sample. It also comprises means (not shown in FIG. 1) for evaporating (separating), in ion form, the atoms forming the sample of material being analysed and accelerating them so that the duly released ions follow a trajectory that causes each evaporated ion 13 to strike the surface of the detector 12 at a given point 14 determined by the position of that ion on the surface of the sample before its separation. Thus, atom-by-atom erosion for reconstructing the composition of the sample, atom layer by atom layer, makes it possible to determine the composition in three dimensions of the sample concerned.

In order to isolate all the external disturbances, the probe also comprises a vacuum chamber (not shown in FIG. 1), the potential of which is, for example, that of the ground of the system in which the probe is included.

There is thus obtained, as illustrated in FIG. 3, a device comprising a source of ions consisting of the sample 11, an analysis chamber, or flight chamber, of length L (analysis length) and a planar detector 12, the dimensions of which cover a circular surface of diameter D. Depending on the type of probe, the electrical field prevailing in the flight chamber varies in value and can, for example, be nil. In the latter case, the ions are propagated at constant speed inside the flight chamber.

When an ion arrives on the detector, said detector measures the position (x, y) on its surface of the point of incidence of the received ion. The detector also measures the "flight time", a duration counted from the moment corresponding to the separation of the ion concerned. A geometrical correction is also applied so that the position of the point of impact can be taken into account in calculating the distance travelled between the point and the detector. Then, the position on the surface of the sample, occupied by the ion concerned before its separation, is deduced in a known manner from the position of its point of impact on the surface of the detector, by the application of a simple projection rule.

In the case of a so-called "3D" tomographic probe, the detector 12 also determines the moment of arrival of the ion concerned, relative to a known time reference, usually corresponding to the moment at which the analysis of the sample 11 began. Measuring this moment advantageously gives the depth at which the ion concerned was situated relative to the initial surface of the sample and thus produces a true position in three dimensions of the atom from which the ion concerned in the sample 11 of material being analysed originates.

As illustrated in FIGS. 1 to 3, the sample 11 is a piece of material in the shape of a substantially tapered point with an end forming a spherical cap of radius R which can vary during the analysis time. In practice, since the tomographic analysis consists in separating, in evaporating one after the other, the atoms that form the atom layers that make up the material, the radius of this spherical cap 21, initially of a given value $R_1$, has a value $R_2$ corresponding to the spherical cap 22 that exists at the end of the analysis; the erosion of the point at the same time causes an equivalent variation in the distance between the sample 11 and the detector 12.

FIG. 3 illustrates, the length L of the analysis chamber and the diameter D of the detector define an angle θ such that $\tan(\theta/2)=(D/2)/L$. θ is called the "acceptance angle" of the probe. Only the trajectories contained within the cone of half-angle θ/2 strike the detector. If D is too small, some trajectories are not intercepted by the detector and the ions following these trajectories will not cause any impact on said detector. Since these undetected ions are not the subject of any analysis, they will be evaporated as pure loss.

Consequently, with θ thus defined, a tomographic atom probe can also be characterized, in a known manner, by different parameters that are, notably, its magnification G, and by the potential difference V that should exist between the point 11 forming the sample and the inlet of the analysis chamber itself, the potential difference being responsible for the acceleration imparted on the evaporated ions to pass the electrical field to be applied through the analysis chamber of length L. This potential difference is conventionally defined by the relation E=V/R, in which E represents the evaporation electrical field and R the radius of curvature of the point, in other words the radius of the spherical cap forming its end.

The magnification is given by the relation G=L/bR, in which L represents roughly the length of the analysis chamber and bR the distance to the end 23 of the point from a point P, or projection point, from which the ion trajectories are all defined. The coefficient b which depends on the geometry of the instrumentation, point, detector and vacuum chamber is typically between 1 and 2.

In such a device, the ions evaporated by field effect on the surface of the point 11 are identified by flight time mass spectrometry. Thus, v, the speed of displacement of the ions, is determined by the acceleration voltage of the ions according to the formula:

$$\frac{1}{2}Mv^2 = neV$$

in which M represents the mass of the ion, v its speed, n the number of individual charges borne by the ion; e the elementary charge, that is to say the charge of the electron, and V the acceleration voltage applied. Therefore, the flight time of an ion being given by the relation:

$$T = \frac{L}{v},$$

the mass of the ion will be determined according to the flight time, according to the relation:

$$M = \frac{2neV}{L^2}T^2$$

Since the mass resolution δM/M is proportional to the precision on the flight time δT/T, it is advantageous to have the greatest possible flight time T, and consequently the greatest possible distance L. In other words, since the measurement of the flight time is essential in the instrument to identifying the ratio m/q of a detected ion, m being the mass of the ion and q its electrical charge, it is advantageous to increase the distance L between the sample and the detector in order to also increase the flight time. A counterpart to this increase in the distance L is a reduction in the acceptance angle θ=2 arctan(D/2L). A large proportion of the emitted beam can then escape from the detector of dimension D, certain trajectories 15 not being intercepted by the detector 12.

Figure 4:
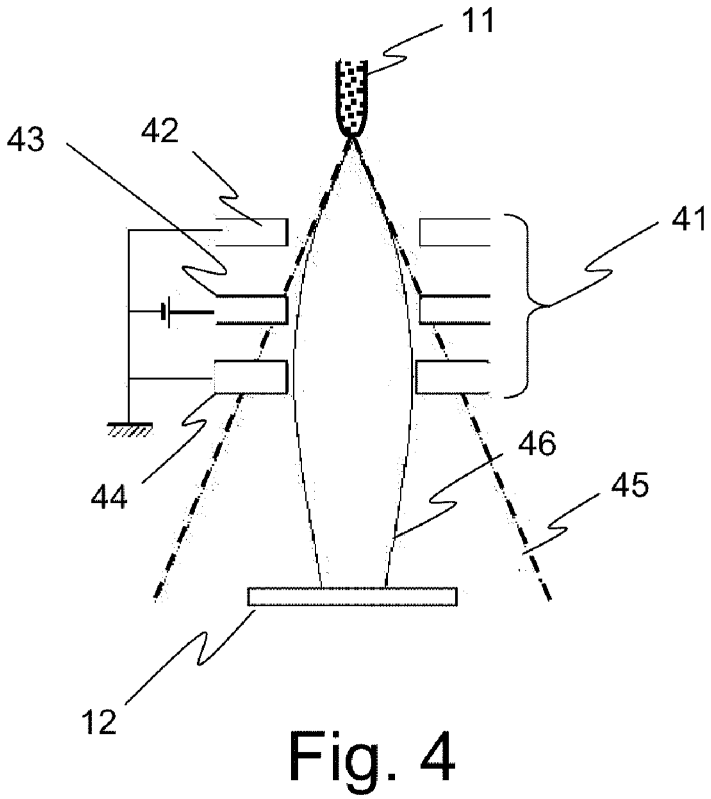
FIG. 4, an illustration of the operating principle of a tomographic probe incorporating an "Einzel" lens in the ion flight chamber.

Thus, to increase L, and therefore the mass resolution without in any way reducing the acceptance angle θ, it is generally necessary to add, to the arrangement illustrated in FIGS. 1 to 3, a device for focussing the beam of ions emitted by the sample 11 on the constructed detector 12. This device can, for example, be constructed as illustrated in FIG. 4, using an electrostatic lens 41, such as an "Einzel" lens, a device well known in charged particle optics, placed between the sample 11 and the detector 12. According to a well known principle, the "Einzel" lens consisting of three electrodes 42, 43 and 44, placed on the path of the ions and configured to have a portion of the trajectory of these ions governed by an electrical field that acts directly on this trajectory. In this way, the initially divergent beam 45 is modified to a convergent beam 46, the convergence obtained being a function of the intensity of the electrical field produced.

To create this electrical field, the electrodes forming the lens are brought to appropriate potentials. Thus, for example, for a tomographic probe in which the detector is set to the ground potential, the "Einzel" lens may comprise a first electrode 42, placed in the vicinity of the sample 11, itself grounded, then a second electrode 43 brought to a positive potential, then finally a third electrode 44 also brought to ground, so that, at the output of the lens, the ions pursue their trajectories in a space with no electrical field. In this case, the first electrode 42 also serves as the extracting electrode, or counter-electrode, or even local electrode, which is usually placed in the tomographic atom probes to locate the electrical field that produces the initial acceleration of the ions evaporated from the sample.

Such a focussing device can advantageously be used to limit the percentage of ions whose trajectories do not encounter the detector. However, its efficiency remains generally limited by the fact that any electrostatic lens exhibits what is called a spherical aberration which is reflected in an overconvergence of the outer region of the lens and an overfocussing for the most off-centre trajectories because, as illustrated in FIGS. 5 and 6 (cross-sectional diagrammatic views) on two exemplary lens configurations, one and the same point 51, 61 of the detector can intercept several distinct trajectories at a time, resulting in an indeterminacy concerning the origin position of an ion that has struck the detector at that point.

Figure 5:
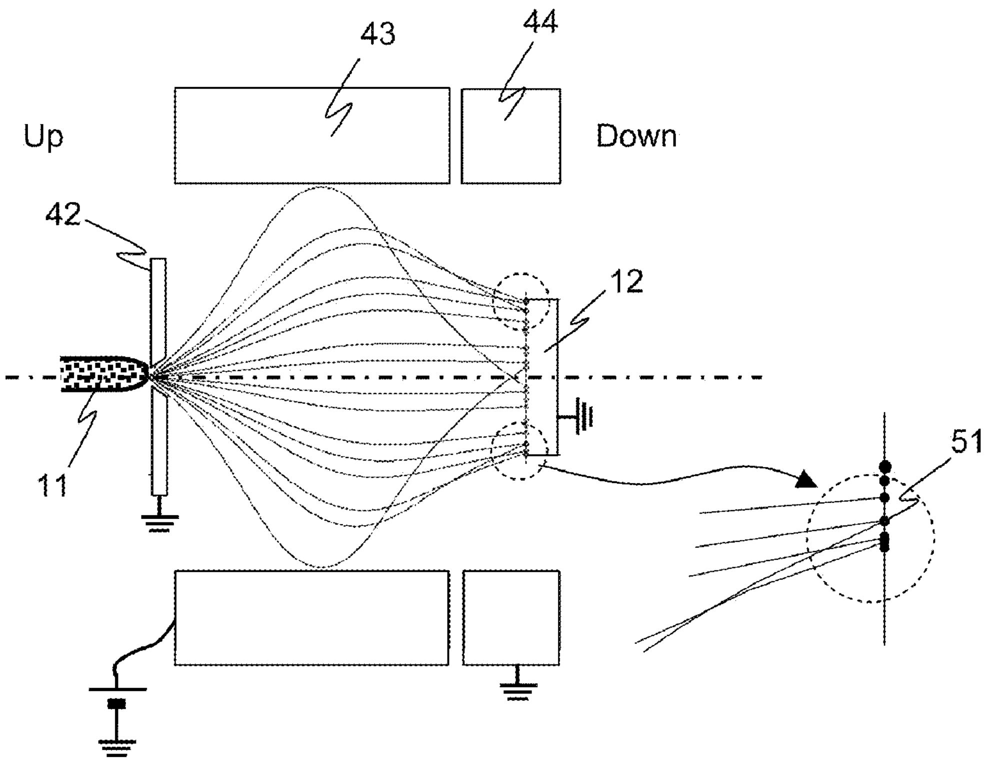
FIGS. 5 and 6, illustrations of the aberration phenomenon which occurs with strong focussing.

Regarding the configuration of FIG. 5, this corresponds, for example, to an atom probe in which the sample 11 has its point brought to a voltage of 15 kV, whereas the first electrode 42 of the "Einzel" lens (closest to the sample), which is used as extracting electrode, is grounded, the second electrode 43 is brought to a voltage of 14 kV and the third electrode 44 (closest to the detector) is also grounded, just like the detector 12. In this configuration, the relative dimensions of the second and third electrodes are such that, during most of their path, the ions remain subject to a focussing electrical field.

Figure 6:
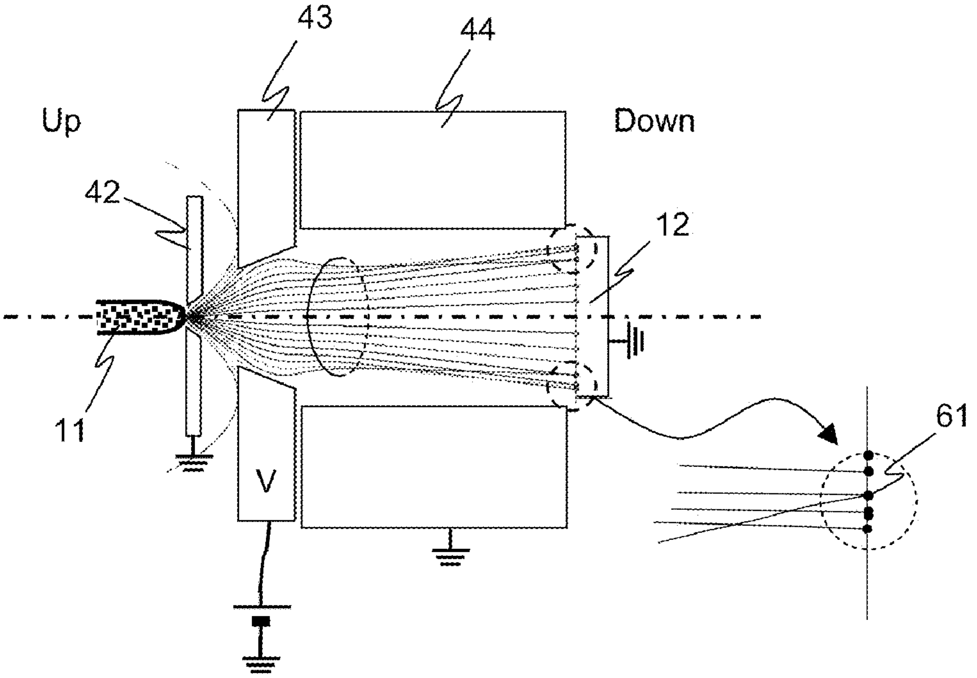

The configuration of FIG. 6 corresponds, for example, to an atom probe in which the sample 11 has its point brought to a voltage of 15 kV, whereas the first electrode 42 of the "Einzel" lens (closest to the sample), which is used as extracting electrode, is grounded, the second electrode 43 is brought to a voltage of 12.5 kV and the third electrode 44 (closest to the detector) is also grounded, just like the detector 12. In this configuration, unlike the preceding configuration, the relative dimensions of the second and third electrodes are such that, during most of their path, the ions pass through a fieldless space, in which there is no focussing effect.

Figure 7:
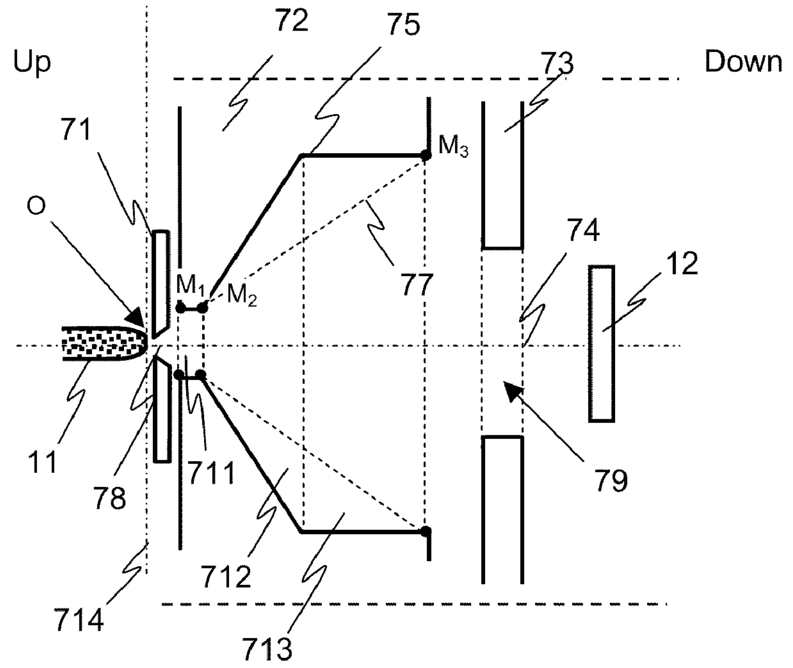
FIG. 7, an illustration of the focussing device of the atom probe according to the invention.
Figure 8:
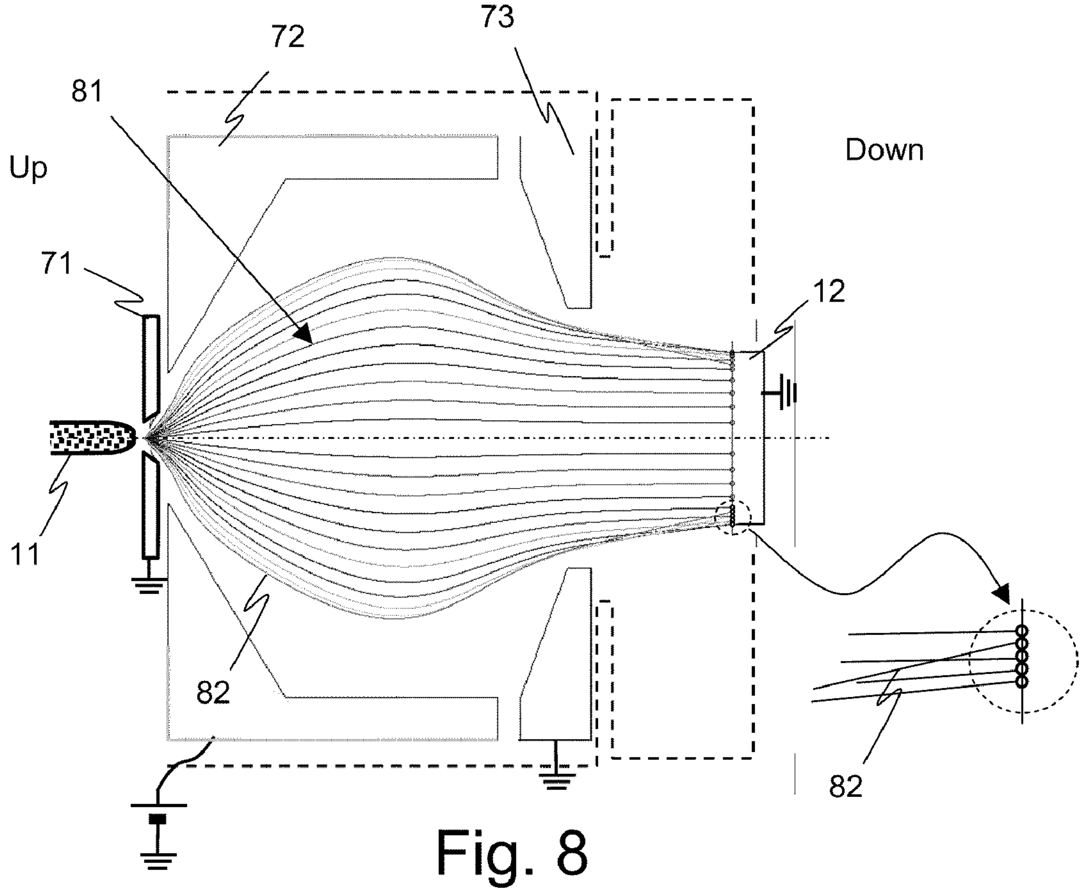
FIG. 8, an illustration of an exemplary beam obtained by means of the focussing device of the atom probe according to the invention.

Interest is now focussed on FIGS. 7 and 8 which present the structure of the atom probe according to the invention. Said atom probe has a general structure that is perfectly well known, with a sample holder for receiving the sample 11 of material to be analysed, and a detector 12 sensitive to the impacts of the ions evaporated from the sample and propelled against its sensitive surface. Conventionally, the probe according to the invention also comprises an accelerating electrode, or extractor, positioned close to the sample, and an electrostatic lens of "Einzel" type to focus the electron beam that is produced, consisting of three adjacent electrodes 71, 72 and 73, the first electrode of the "Einzel" lens consisting of the accelerating electrode. Also conventionally, the electrodes of the electrostatic lens are polarized so that, given the respective biases of the sample and of the detector, the evaporated ions are initially accelerated towards the detector, and are then subject, during a part of their path, corresponding to the passage through the lens, to a focussing electrical field.

The three electrodes are, moreover, preferentially configured and arranged in such a way as to provide in the flight chamber a free space that is sufficient to house a removable probe adjusting device. The adjusting device can, for example, be a field ion microscope.

The area of the detector can, moreover, according to the embodiment concerned, be brought to an intermediate potential between that of the sample and that of the extracting electrode 71. The potential concerned is set directly or via a grating arranged in proximity to the detector. According to a variant embodiment, this potential is that to which the extractor is brought.

To be able to have an analysis length L (flight length) substantially greater than that which can be accessed with the existing probes, the geometry and the arrangement of the electrodes 71, 72 and 73 forming the electrostatic lens in this case satisfy specific technical specifications described hereinafter in the description.

According to the invention, the electrodes of the electrostatic lens are formed by mechanical parts that have a central aperture and a symmetry of revolution about a central axis, combined with the axis 74 joining the tip of the point forming the sample 11 of material to the detector 12 and perpendicular to the plane of the detector.

The first electrode 71, or extractor, situated in proximity to the sample 11 and serving as extracting electrode is preferentially a piece of small thickness having a hole 78 for the passage of the ions, a circular hole for example.

Similarly, the third electrode 73 of the electrostatic lens is any electrode, preferentially of relatively small thickness and having a central aperture 79 with a diameter greater than or at least roughly equal to the diameter D of the detector 12, so as to allow for the propagation of the evaporated ions to the detector, and to do so regardless of the trajectory followed by these ions in the lens.

Regarding the second electrode 72, central electrode of the lens, the latter has a shape defining an internal space whose dimensions advantageously vary over the length of the electrode. Thus, according to the invention, the second electrode 72 comprises a first segment 711 adjacent to the first electrode 71 and having a cylindrical aperture centred on the axis 74, of a radius $r_1$ suitable for the passage of the beam of evaporated ions. It also comprises a second segment 712, having a cylindrical aperture centred on the axis 74 and of radius $r_2$, the radius $r_2$ adapted to the width of the beam being greater than the radius $r_1$. It also comprises a third segment 713, having a tapered aperture linking the aperture of the first segment to that of the second segment. In this way, as the cross-sectional view of FIG. 7 illustrates, the profile 75 of the inner surface of the second electrode describes a broken line passing through the three points $M_1(z_1$, $M_2(z_2, r_2)$, $M_3(z_3, r_3)$. According to the invention, $z_1$, $z_2$ and $z_3$ represent the abscissae on the axis 74 of the points M1, M2 and M3 relative to an origin O of abscissa $z_0$ situated at the point of the sample of material 11 and represented in the figure by the intersection of the axes 74 and 714. As for the parameters $r_1$, $r_2$ and $r_3$, these represent the values of the radius of the aperture at the point concerned. These parameters are defined in such a way as to satisfy the following conditions:

$$0;1\cdot D<r_1<0.65\cdot D \quad \text{a)}$$

$$r_2=r_1 \quad \text{b)}$$

$$D<r_2<1.6\cdot D \quad \text{c)}$$

$$|z_1-z_0|<D/3 \quad \text{d)}$$

$$|z_2-z_1<0;65\cdot D \quad \text{e)}$$

$$|z_3-z_1|<1.4\cdot D \quad \text{f)}$$

g) at any point $M_i(r_i, z_i)$ of the area M2M3 of the profile 75, that is to say for $z>z_2$, the following applies:

$$r_i \geq A\cdot z_i + B$$

$$\text{with } A=\frac{r_3-r_2}{z_3-z_2}$$

$$\text{and } B=\frac{r2\cdot z_3-r_3\cdot z_2}{z_3-z_2}$$

The condition g) amounts to stating that all the points of the cross-sectional profile 75 of the electrode situated between $M_1$ and $M_3$ should be situated outside the area of the cross-sectional plane delimited by the profile of a cone limited by the points $M_2$ and $M_3$.

Calculations carried out elsewhere by the applicant, and not presented here, show that, by virtue of this particular configuration of the electrodes forming the electrostatic lens, it is possible, by applying the appropriate potentials to the different electrodes, as illustrated in FIG. 8, to obtain a focussing of the ion beam 81 that is sufficient to bring to the detector a set of trajectories affected by small-scale aberrations. The invention enables notably a position detector 12 of a diameter D, placed at a distance L' greater than 2 L from the sample 11, to be used in an atom probe, L being like the maximum length of analysis without focussing, a length defined in a known manner by the relation $\tan(\theta/2)=(D/2)/L$, equivalent to L=1.374 D when the half-aperture $\theta/2$ is 20°. Thus, for an aperture angle θ equal to ±20°, and for a detector diameter D equal to 80 mm, it is advantageously possible, by virtue of the atom probe according to the invention, to obtain an analysis length greater than twice the value L=1.374 D=109 mm, while intercepting with the detector all the trajectories of the emitted ions corresponding to this aperture angle. By increasing the analysis distance by a factor at least equal to 2, it is possible to obtain, by applying to the ion beam a focussing electrical field of appropriate intensity (that is to say, applying the appropriate bias voltages to the electrodes), a mass resolution improved by a factor greater than two. This resolution is advantageously obtained without the detector undergoing the effects of confusion of the impact points, or at least by undergoing these effects in a much lesser way, the effects being caused by the spherical aberration of the electrostatic lens. With the aperture angle otherwise remaining unchanged, the resolution is increased here without leading to any additional limitation of the analysed surface.

Figure 9:
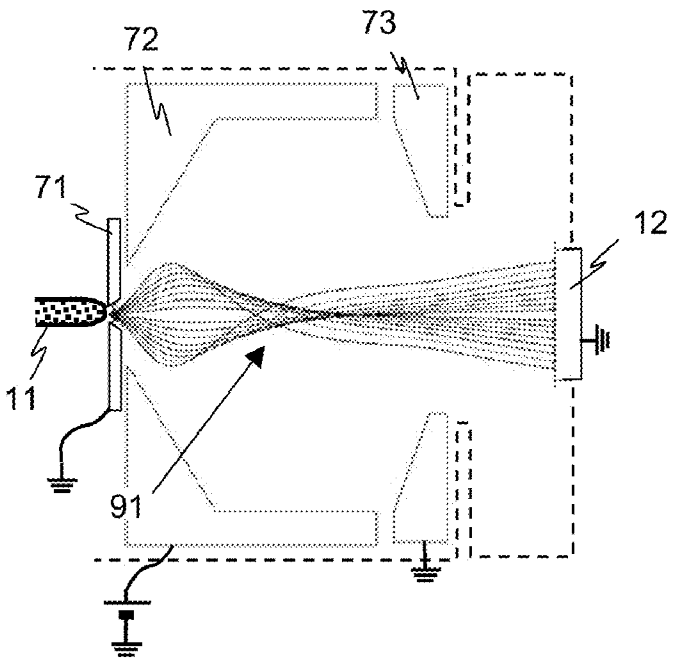
FIG. 9, an illustration of another exemplary focussed beam obtained by means of the focussing device of the atom probe according to the invention.

Thus, by virtue of its structural characteristics, the probe according to the invention makes it possible to very significantly increase the analysis length that can be used. The intensity of the focussing is still defined by the value of the bias voltages applied to the different electrodes of the focussing lens produced. According to the biases applied, the ion beam will be more or less focussed, the objective being, however, for the focussed beam to cover the greatest possible surface area on the detector. The focussed ion beam can then, for example, depending on the case, take the form of the beam 81 illustrated in FIG. 8, or even that of the beam 91 illustrated in FIG. 9. In the case of FIG. 8, the beam 81 is obtained by applying, for example, a voltage of 13.7 kV to the second electrode 72 and grounding the first and third electrodes, the detector also being grounded and the sample being brought to a voltage of 15 kV. In the case of FIG. 9, the beam 91 is obtained by applying, for example, a voltage of 15.1 kV to the second electrode 72 and by grounding the first and third electrodes, the detector and the sample, as in the preceding case, also being respectively grounded and brought to a voltage of 15 kV.

The architecture of the atom probe according to the invention, as described in the preceding paragraphs, corresponds to a basic common architecture, the probe according to the invention being able, in practice, to comprise certain variant embodiments corresponding to specific applications such as those presented in a nonlimiting manner hereinafter in the description.

Figure 10:
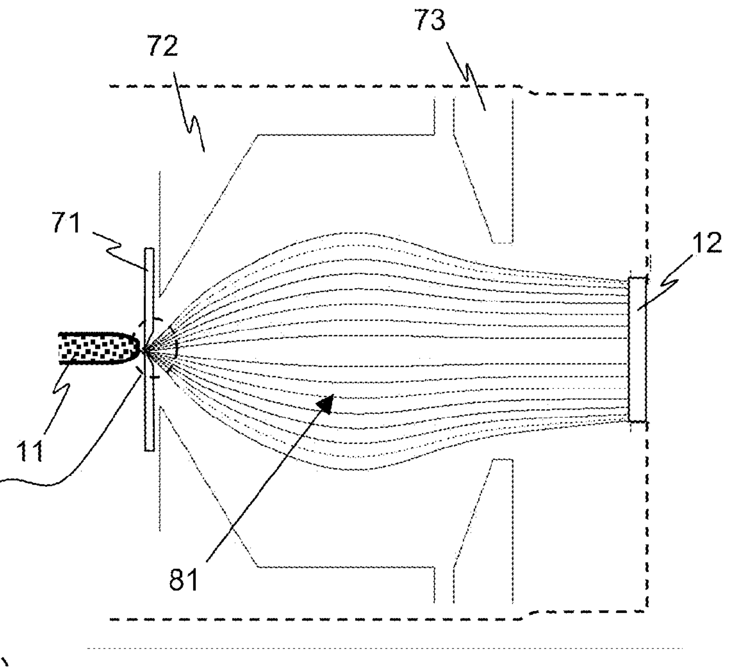
FIGS. 10, 11 and 12, illustrations of a variant embodiment of the atom probe according to the invention.
Figure 11:
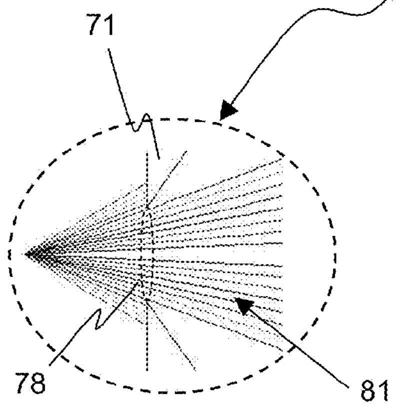
Figure 12:
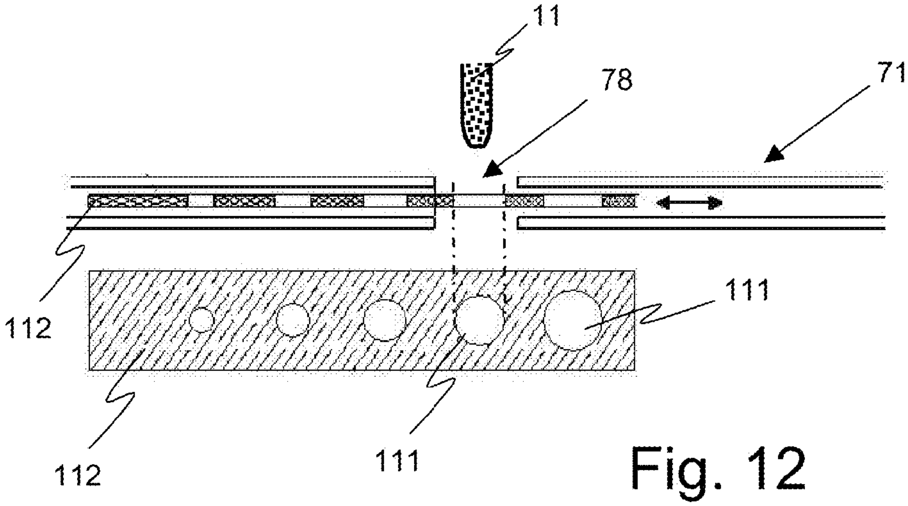

Interest is now focussed on FIGS. 10 to 12, which illustrate a first variant embodiment of the probe according to the invention. In this variant, presented as a nonlimiting exemplary embodiment, the first electrode 71 forming the focussing lens, the extracting electrode, comprises a central aperture 78 equipped with a device with multiple apertures. This device consists, as illustrated in FIG. 12, of a strip of diaphragms 112 arranged in such a way as to slide in front of the central aperture 78 of the electrode 71. The diameters of the different diaphragms 111 of the strip 112, less than that of the central aperture 78, are defined in such a way as to reduce to a greater or lesser degree the diameter of the orifice for the passage of the ions emitted by the sample 11. Thus, as illustrated by FIGS. 10 and 11, it is advantageously possible, depending on the requirements, to adapt the diameter of the aperture 78 to allow all of the emitted ion beam 81 to pass or to eliminate from the beam the ions that have the most peripheral trajectories, notably to limit the width of the sample surface being analysed and therefore the aperture angle of the corresponding ion beam that will be detected by the sensor. The diameter d of the aperture of the extractor is thus adapted to intercept the peripheral part of the beam of emitted ions so as to block the ions that have the most peripheral trajectories.

It should be noted that, as FIG. 12 illustrates, the various diaphragms are arranged on the strip so that the distance between two contiguous diaphragms is sufficient for all except the diaphragm being used to be perfectly masked by the electrode. The positioning in the two dimensions perpendicular to the axis of the beam can, moreover, be obtained by an appropriate mechanism, possibly controlled by a computer and arranged outside the chamber of the probe.

Figure 13:
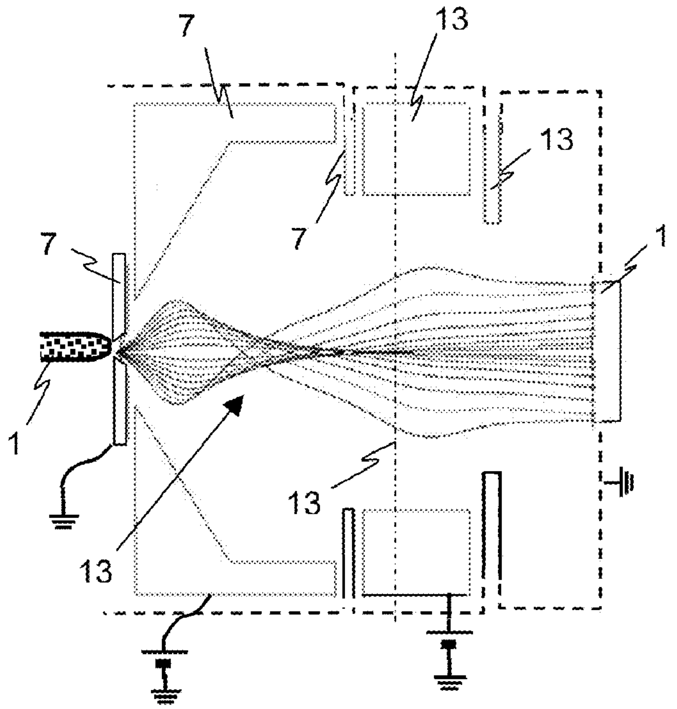
FIG. 13, the illustration of another variant embodiment of the atom probe according to the invention.

Interest is now focussed on FIG. 13, which illustrates a second variant embodiment of the probe according to the invention. In this variant, also shown as a nonlimiting exemplary embodiment, the atom probe according to the invention comprises a second focussing lens, of the "Einzel" lens type for example, placed between the first lens and the detector. This particular configuration makes it possible to apply a compensation for the residual spherical aberration presented by the first focussing lens, despite its particular configuration, this spherical aberration of the first lens not always being able to be avoided.

The atom probe according to the invention, in this variant embodiment, comprises, in addition to the three electrodes 71, 72 and 73 forming the first lens, two complementary electrodes 132 and 133, the electrode 132 being placed adjacent to the electrode 73 and the electrode 133 being placed adjacent to the electrode 132, between that electrode and the detector 12.

The electrode 133 is brought to a potential roughly equal to that of the electrode 73, whereas the electrode 132 is brought to a potential enabling all three electrodes 73, 132 and 133 to thus form a second electrostatic lens containing an electrical field.

In this particular configuration with two lenses, the second electrode 72 of the first lens and the second electrode 131 of the second lens are brought to potentials defined to:

- produce, with the help of the first lens, the focussing of the trajectories of small aperture on the median plane of the second lens, represented by the dotted line 134 in FIG. 13. In this way, the second lens, consisting of the electrodes 73, 132 and 133, has no effect on the trajectories of small aperture.
- apply, with the help of the first lens, an overfocussing of the trajectories of greater apertures. The aberrations that then appear are corrected by applying the appropriate potential to the central electrode 132 of the second lens.

The electrical field applied to the ion beam inside the second electrostatic lens can, depending on the scenario envisaged, be an accelerating or delaying field.

Such a device can, for example, be obtained from a structure such as that illustrated by FIG. 13. With the detector 12 brought to ground potential and the sample 11 to a potential of 15 kV, the extracting electrode 71 is then grounded, as are the electrodes 73 and 133, whereas the central electrode 72 of the first lens is brought to a voltage of 15.3 kV and the central electrode 132 of the second lens is brought to a voltage of 14.5 kV.

The invention claimed is:

1. Tomographic atom probe comprising:

a sample-holding device for receiving a sample of material to be analysed having an extraction area of substantially pointed shape, a position-sensitive detector of useful diameter D and spaced apart from the sample by a distance L;

an electrostatic lens consisting of three electrodes, a first electrode or extractor, arranged in proximity to the sample, an intermediate second electrode, and a distal third electrode arranged between the intermediate electrode and the detector, the three electrodes having a symmetry of revolution about the axis Oz passing through the point of the sample and perpendicular to the plane P of the detector, wherein the extractor comprises a number of diaphragms of different aperture diameters produced on a moving bar that can slide in front of the aperture of the extractor so as to place the desired diaphragm in front of the aperture; the sliding movement of the bar being automated, and since the distance L is greater than 2.75 D, the respective potentials of the sample, of the first electrode of the lens and of the detector are such that the ions deriving from the sample mounted on the sample-holder are attracted towards the first electrode and towards the detector; the cross-sectional profile of the intermediate electrode, in a cross-sectional plane rOz passing through the axis Oz, defining three points $M_1$, $M_2$ and $M_3$ of respective coordinates $(r_1, z_1)$, $(r_2, z_2)$ and $(r_3, z_3)$ relative to an origin $z_0$ on the point of the sample, which satisfy the following conditions:

$$z_1<z_2<z_3,$$

$$|z_1-z_0|<D/3,$$

$$|z_2-z_1|<0.65\cdot D,$$

$$|z_3-z_1|>1.4\cdot D,$$

$$r_2=r_1,$$

$$0.1\cdot D<r_1<0.65\cdot D,$$

$$D<r_3<1.6\cdot D;$$

all the points of the cross-sectional profile of the electrode being situated outside the area of the cross-sectional plane delimited by the profile of a cone with cylindrical tip limited by the points $M_1$, $M_2$ and $M_3$.

2. Tomographic atom probe according to claim 1, wherein the detector or a grating arranged in proximity to the detector is at a potential equal to that of the extractor.

3. Atom probe according to claim 1, wherein the detector or a grating arranged in proximity to the detector is at an intermediate potential between that of the sample and that of the extractor electrode.

4. Tomographic atom probe according to claim 1, wherein the diameter d of the aperture of the extractor is determined in such a way as to intercept the peripheral portion of the beam of emitted ions so as to block the ions that have the most peripheral trajectories.

5. Tomographic atom probe according to claim 4, wherein the number of diaphragms of different aperture diameters of the extractor can be alternately arranged at the level of the central aperture of the extractor.

6. Tomographic atom probe according to claim 1, wherein said three electrodes are configured and arranged in such a way as to provide, inside the flight chamber, a free space that is sufficient to house a removable probe adjusting device.

7. Tomographic atom probe according to claim 6, wherein said free space is sufficient to have a field ion microscope in the probe.

8. Tomographic atom probe according to claim 1, wherein a second electrostatic lens is placed between the first electrostatic lens and the detector.

9. Tomographic atom probe according to claim 8, wherein the first electrostatic lens is configured to focus the least open trajectories in proximity to the median plane of the second electrostatic lens.

10. Tomographic atom probe according to claim 8, wherein the second electrostatic lens generates a delaying electrical field.

11. Tomographic atom probe according to claim 8, wherein the second electrostatic lens generates an accelerating electrical field.

12. Tomographic atom probe according to claim 1, wherein the extractor is subjected to a pulsed potential.

13. Tomographic atom probe according to claim 1, wherein the ions of the material are separated from the sample by means of a pulsed laser.

14. Tomographic atom probe according to claim 13, wherein the extractor is subjected to a pulsed potential synchronized with the laser emission.

* * * * *